United States Patent
Oshima (12)

(10) Patent No.: US 6,463,300 B1
(45) Date of Patent: Oct. 8, 2002

(54) MOBILE COMMUNICATION TERMINAL ALLOWED TO COMMUNICATE WITHIN DETACHABLE IC CARD AND METHOD OF ALLOWING IT TO ACCESS THE NETWORK

(75) Inventor: Hiroyuki Oshima, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/545,762

(22) Filed: Apr. 10, 2000

(30) Foreign Application Priority Data

Apr. 20, 1999 (JP) .......................................... 11-112892

(51) Int. Cl.⁷ ................................................ H04B 1/38
(52) U.S. Cl. ........................ 455/558; 455/557; 455/575; 455/566; 710/13; 340/825.31; 340/825.34
(58) Field of Search ................................ 455/557, 558, 455/575, 566, 418, 410; 710/13; 340/825.31, 825.34

(56) References Cited

U.S. PATENT DOCUMENTS

| | | | | |
|---|---|---|---|---|
| 5,940,773 A | * | 8/1999 | Barvesten | 455/558 |
| 5,978,919 A | * | 11/1999 | Doi | 713/202 |
| 5,996,028 A | * | 11/1999 | Niimi et al. | 455/410 |
| 6,138,005 A | * | 10/2000 | Park | 455/411 |
| 6,148,192 A | * | 11/2000 | Ahvenainen | 379/357.01 |
| 6,179,205 B1 | * | 1/2001 | Sloan | 235/379 |
| 6,216,015 B1 | * | 4/2001 | Hymel | 455/412 |
| 6,263,214 B1 | * | 7/2001 | Yazaki | 455/558 |
| 6,263,215 B1 | * | 7/2001 | Patton et al. | 455/117 |

FOREIGN PATENT DOCUMENTS

EP 0607767 7/1994

* cited by examiner

*Primary Examiner*—Lester G. Kincaid
*Assistant Examiner*—Khawar Iqbal
(74) *Attorney, Agent, or Firm*—Scully, Scott, Murphy & Presser (57) ABSTRACT

A mobile communication terminal includes a body and an IC (Integrated Circuit) card. The IC card is mounted on the body. The body includes an input portion, a detecting portion, a first controller, a second controller, and a third controller. The input portion is used to inputting a first code or a second code. The detecting portion detects whether or not the mounted IC card is same as an IC card mounted when the mobile communication terminal has previously accessed a network as a previous IC card. The first controller allows the body to be operated in response to the first code from the input portion when the detecting portion detects that the mounted IC card differs from the previous IC card. The second controller allows the body to be operated when the detecting portion detects that the mounted IC card is same as the previous IC card. The third controller allows the mobile communication terminal to access the network in response to the second code from the input portion after the first controller allows the body to be operated.

17 Claims, 6 Drawing Sheets

MOBILE COMMUNICATION TERMINAL ALLOWED TO COMMUNICATE WITHIN DETACHABLE IC CARD AND METHOD OF ALLOWING IT TO ACCESS THE NETWORK

BACKGROUND OF THE INVENTION

1. Field of the Invention

The present invention generally relates to a mobile communication terminal which is allowed to communicate within detachable IC (Integrated Circuit) card, and a method of allowing it to access the network.

2. Description of the Related Art

Very recently, a mobile communication terminal used in a portable communication system or a car telephone system has been much in demand due to request from personal communication.

The mobile communication terminal has risks such that it is lost or stolen, since a owner typically carries it with himself or herself and uses it. Thus, this requires the security with regard to the mobile communication terminal for the loss or the theft in the mobile communication terminal. Conventionally, many security methods have been provided for the mobile communication apparatus.

Japanese Laid Open Patent Application (JP-A-Heisei, 7-193865) discloses a security method for a mobile communication terminal when it is lost or stolen. The mobile communication terminal of this conventional example can receive a remote operation data through a communication line from another communication appliance. Then the mobile communication terminal of this conventional example performs a pre-determined protection process on the mobile communication terminal in accordance with a content of the remote operation data. Accordingly the mobile communication terminal of this conventional example protects an inner data when it is lost, and also protects an accounting trouble caused by another person's usage.

Also, the mobile communication terminal is used in a variety of fields, such as analog cellular systems, digital cellular systems, and cordless telephone systems. A GSM (Global System for Mobile Communication) system is one of the digital cellular systems, and is established as a Pan-European uniform standard system. Then, a GSM system has been offering the digital cellular telephone service.

A mobile communication terminal of this GSM system can access (call) a network within an IC card storing a plurality of data in a memory of the IC card. This IC card is referred to as an SIM (Subscriber Identity Module) card in the GSM system. So, data with regard to a owner of the mobile communication terminal is included in the plurality of data stored in the memory in the SIM card.

The data with regard to the user include a subscriber number (IMSI: International Mobile Subscriber Identity), an identification number (PIN: Personal Identification Number), a service status code, a shorten telephone number inputted by a subscriber.

Moreover, a mobile communication terminal into which the SIM card is inserted is defined as an MS (mobile station), and a mobile communication terminal into which the SIM card is not inserted is defined as an ME (Mobile Equipment). That is, the ME and the SIM card integrally constitute the MS to accordingly enable the access to the network. In this way, the SIM card is an essential element in the GSM system.

IN the GSM system, the MS as any ME in which the SIM card of a subscriber is inserted can access the network. That is, the subscriber carries only the SIM card without carrying the one's ME. For example, the subscriber brings only the SIM card during travel, and borrows the ME at his or her destination in travel, and then can access the network with the MS as the borrowed ME inserting his or her SIM card.

In the GSM system, the MS as any ME inserted any SIM card can access the network. when the MS is lost or stolen, a MS can access the network by pulling out an SIM card inserted into a lost or stolen MS, inserting another SIM card, and inputting a corresponding PIN. Thus, there may be a high possibility that the ME is not returned back to its owner.

Otherwise, the following conventional techniques are disclosed in relation to the IC card and the mobile communication terminal.

Japanese Laid Open Patent Application (JP-A-Heisei 10-200522) discloses a method of encoding data by means of an IC card, a system of encoding data by means of an IC card, and the IC card. This conventional example relates to encoding data by means of the IC card. Especially, this conventional example encodes data including user data indicating the status of users capable of decoding the data, and stores the encoded data in the IC card. Only the users of the status can decode the encoded data in the IC card and take out the decoded data of the IC card. Moreover, This conventional example remotely manages the memory area in the IC card.

Japanese Laid Open Patent Application (JP-A-Heisei 9-114948) discloses an apparatus protecting and managing a security by using an IC card and a method of protecting and managing a security by using an IC card. This conventional example relates to the method of protecting and managing the security by using the IC card. Especially, this conventional example relates to maintenance of the security when the IC card is adapted for a credit card.

Japanese Laid Open Patent Application (JP-A-Heisei 8-511144) discloses a digital radio telephone facility having a mobile communication terminal. This conventional example relates to the digital radio telephone facility operated through an SIM card which can be removed by each mobile communication terminal. This conventional example provides the digital radio telephone facility in which the mobile communication terminal has an auxiliary SIM chip card having service such as an automatic answering telephone function and/or a short message reception function. While the SIM card is pulled out of mobile communication terminal, mobile communication terminal can receive the service of the auxiliary SIM chip card to the SIM card user inserted at a previous time.

Japanese Patent No. 2,659,637 discloses a mobile communication apparatus. This conventional example relates to a mobile communication apparatus capable of communicating related to paying a charge for a telephone call in advance. The mobile communication apparatus of this conventional example can insure the maintenance and reliability with regard to a data of the charge, in which the data transmitted between an accounting device on a transmission side and an advance payment device on a receiving side, and an input of the data of the charge to the advance payment device on the receiving side.

Japanese Laid Open Patent Application (JP-A-Heisei 11-15927) discloses an IC card system. This conventional example relates to a server system. This conventional example automatically connects a pre-determined server system based on a data stored in an IC card, and the server system offers information to a system or apparatus defined automatically by the data stored in the IC card.

In the conventional techniques, if a third person gets a mobile communication terminal which is left alone, loss, or stolen, the ME of the mobile communication terminal can not avoid the third person from being used in the GSM system because of the pursuit of improvement of convenience in the usage of the IC card in the GSM system. Also, the SIM card pulled out from the mobile communication apparatus may be left alone or scraped. Thus, it is difficult to recover a personal data which is important for an owner. Especially, in recent years, a small SIM card having longitudinal and lateral widths of several centimeters and a thickness of several millimeters has been used. Hence, the SIM card attached into the left, loss, or stolen mobile communication terminal may be easy to be scrap.

SUMMARY OF THE INVENTION

The present invention has been made to solve the above-explained problems.

Therefore, an object of the present invention is to provide a mobile communication terminal which is allowed to communicate within detachable IC (Integrated Circuit) card and a method of allowing it to access the network, in which the mobile communication terminal detects whether or not an IC card attached in (or mounted on) the mobile communication terminal is a previously inserted IC card attached in it while the mobile communication terminal previously accessed the network.

Another object of the present invention is to provide a mobile communication terminal which is allowed to communicate within detachable IC card and a method of allowing it to access the network, in which the mobile communication terminal requires a certain procedure when an IC card attached in (or mounted on)the mobile communication terminal differs from a previously inserted IC card attached in (or mounted on)it while the mobile communication terminal previously accessed the network.

Still another object of the present invention is to provide a mobile communication terminal which is allowed to communicate within detachable IC card and a method of allowing it to access the network, in which a body of the mobile communication terminal judges whether or not a user of the body is permitted to the usage of the body.

In order to achieve an aspect of the present invention, the present invention provides a mobile communication terminal includes a body; and an IC (Integrated Circuit) card mounted on the body; in which the body includes an input portion used to inputting a first code or a second code, a detecting portion detecting whether or not the mounted IC card is same as an IC card mounted when the mobile communication terminal has previously accessed a network as a previous IC card, and a first controller allowing the body to be operated in response to the first code from the input portion when the detecting portion detects that the mounted IC card differs from the previous IC card, a second controller allowing the body to be operated when the detecting portion detects that the mounted IC card is same as the previous IC card, and a third controller allowing the mobile communication terminal to access the network in response to the second code from the input portion after the first controller allows the body to be operated.

In the mobile communication terminal, the body may store a body identifying code, and the first controller may allow the body to be operated when the first code matches the body identifying code.

In the mobile communication, the mounted IC card may store a card identifying code, and the third controller may allow the mobile communication terminal to access a network when the second code matches the card identifying code.

In the mobile communication terminal, the detecting portion may detect that the previous IC card is replaced by the mounted IC card after the mobile communication terminal has previously accessed the network.

In the mobile communication terminal, it may further include a power supply portion mounted on the body and supplying power to the body; and the detecting portion may detect that the previous IC card is replaced by the mounted IC card by detecting whether or not the power supply portion is detached from the body after the mobile communication terminal has previously accessed the network.

In the mobile communication, the body may further include a memory storing a first data stored in a pre-determined memory area of the previous IC card, and the third controller may read a second data stored in the pre-determined memory area of the IC card and allow the body to be operated when the first data matches the second data.

In the mobile communication, the memory may further have at least one address and the pre-determined memory area may be indicated in the at least one address.

In the mobile communication terminal, the mounted IC card and the previous IC card may include SIM (Subscriber Identity Module) cards.

In the mobile communication terminal, the memory may include a non-volatile memory.

In the method of allowing a mobile communication terminal to access the network, it may further include (g) storing a body identifying code in the body; and the (d) controlling may allow the body to be operated when the first code matches the body identifying code.

In order to achieve another aspect of the present invention, the present invention provides a method of allowing a mobile communication terminal to access a network, in which the mobile communication terminal includes a body, a power supply portion supplying power to the body, and an IC card mounted on the body, including: (a) detecting whether or not the mounted IC card is same as an IC card mounted when the mobile communication terminal has previously accessed a network as a previous IC card; (b) allowing the body to be operated when the detecting portion detects that the mounted IC card is same as the previous IC card; (c) inputting a first code when the detecting portion detects that the mounted IC card differs from the previous IC card; (d) allowing the body to be operated in response to the first code; (e) inputting a second code after the first controller allows the body to be operated; (f) allowing the mobile communication terminal to access the network in response to the second code.

In the method of allowing a mobile communication terminal to access the network, it may further include (h) storing a card identifying code in the IC card; and the (f) controlling may allow the mobile communication terminal to access the network when the second code matches the card identifying code.

In the method of allowing a mobile communication terminal to access the network, the (a) detecting may detect whether or not the previous IC card is replaced by the mounted IC card after the mobile communication terminal has previously accessed the network.

In the method of allowing a mobile communication terminal to access the network, the (a) detecting may detect whether or not the previous IC card is replaced by the mounted IC card by detecting whether or not the power supply portion is detached from the body after the mobile communication terminal has previously accessed the network.

In the method of allowing a mobile communication terminal to access the network, it may further includes (i) storing a first data stored in a pre-determined memory area of the previous IC card when the mobile communication terminal has previously accessed the network; and the (a) detecting may include (j) reading a second data stored in the pre-determined memory area of the mounted IC card, and (k) comparing the first data to the second data; and the (b) allowing may allow the body to be operated when the first data matches the second data, and the (c) inputting may input a first code when the first data differs from the second data.

In the method of allowing a mobile communication terminal to access the network, it may further include (l) storing at least one address, and the pre-determined memory area may be indicated in the at least one address.

In the method of allowing a mobile communication terminal to access the network, the mounted IC card and the previous IC card may include SIM (Subscriber Identity Module) cards.

DESCRIPTION OF THE PREFERRED EMBODIMENTS

Referring now to drawings, a embodiment of the present invention will be described in detail.

Figure 1A:
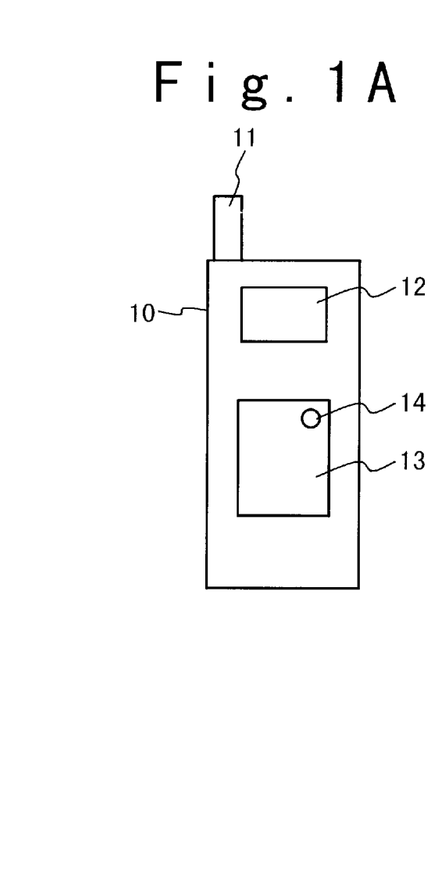
FIG. 1A is a front view showing a mobile communication terminal according to the present invention.
Figure 1B:
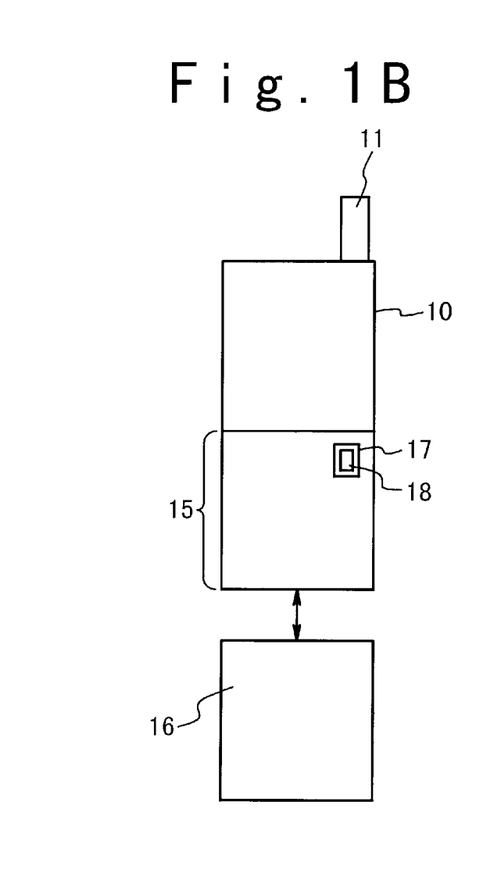
FIG. 1B is a rear view showing a mobile communication terminal according to the present invention.
Figure 1C:
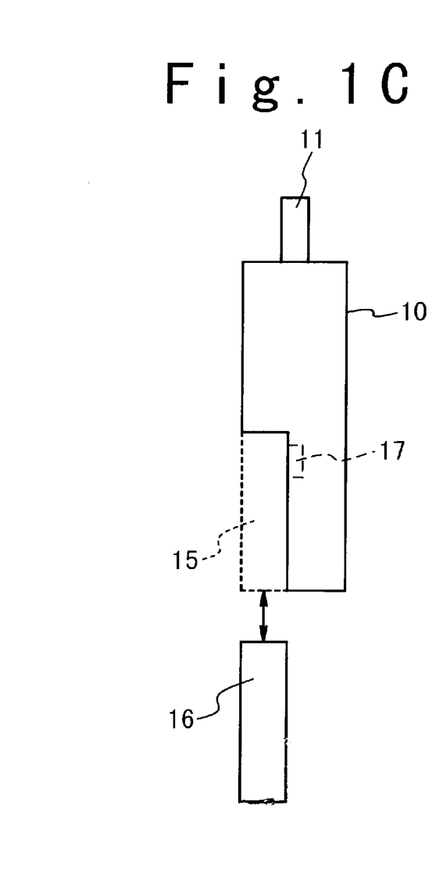
FIG. 1C is a side view showing a mobile communication terminal according to the present invention.

FIGS. 1A, 1B, and 1C show a structure showing a mobile communication terminal (a mobile station) according to the present invention. FIG. 1A shows a front view of the mobile communication terminal, FIG. 1B shows a rear view of the mobile communication terminal, and FIG. 1C shows a side view of the mobile communication terminal.

An antenna 11, a display 12, and a key input section 13 are mounted on a front surface portion of a mobile station 10 according to the present invention. The antenna 11 relates a transmission and a reception of a signal. The display 12 displays various data such as an originating telephone number. The key input section 13 contains various keys and a user can input various data such as a telephone number in the mobile station 10 with the key input section 13. The key input section 13 contains a power source key 14. A power is supplied to the mobile station 10 in response to the power source key 14 is pushed down.

A power supply pack detachable section 15 is mounted on a rear surface portion of the mobile station 10. A power supply pack 16 can be attached at (mounted on) the power supply pack detachable section 15. The power supply pack 16 attached to the mobile station 10 can supply a power to the mobile station 10. An SIM card installation section 17 is mounted in a part of the power supply pack detachable section 15. An SIM card 18 is attached in the SIM card installation section 17.

The SIM installation section 17 is covered on the power supply pack 16 when the power supply pack 16 is mounted in the mobile station 10. The mobile station 10 has a configuration of avoiding the attaching SIM card 18 from being detached and being touched by the user while the mobile station 10 is used.

The function of the mobile station 10 according to the present invention will be described below.

Figure 2:
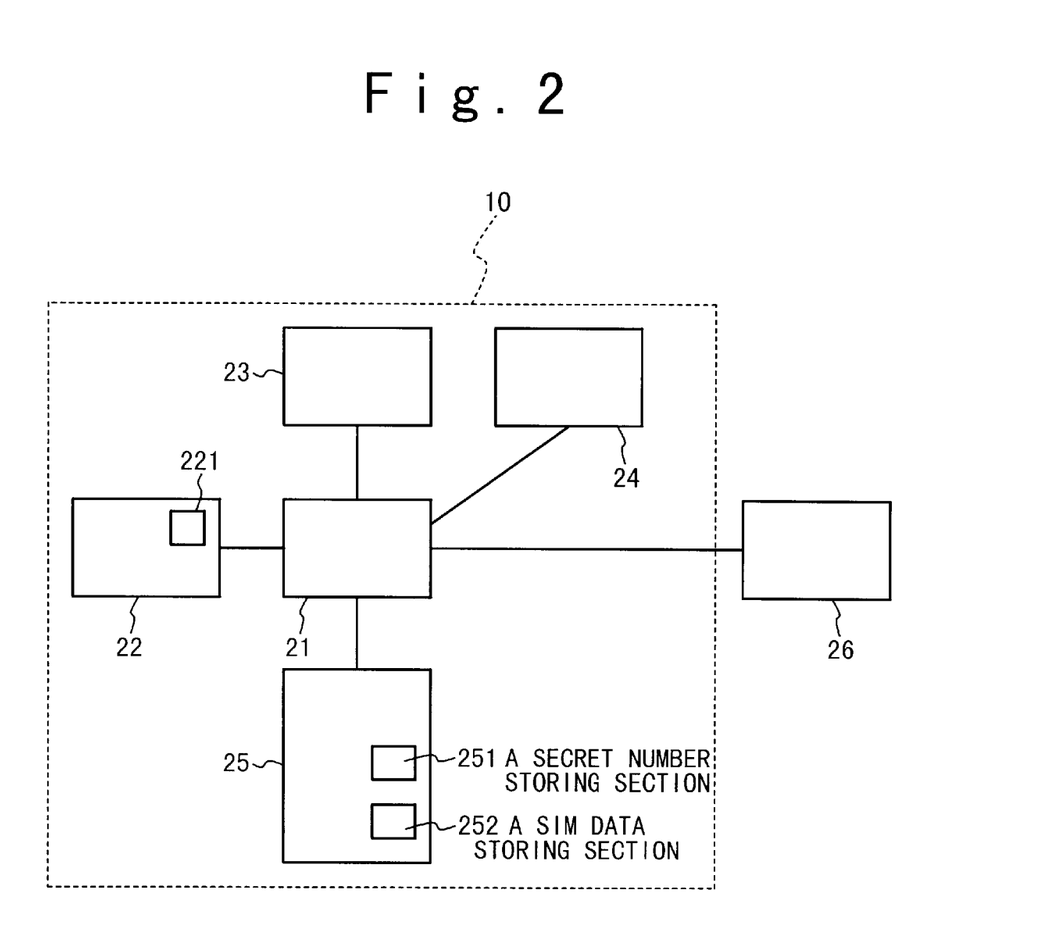
FIG. 2 shows a function block diagram of the mobile communication terminal according to the present invention.

FIG. 2 shows a function block of the mobile communication terminal according to the present invention.

Referring to FIG. 2, the mobile station 10 includes a controller 21, a key input section 22, a display 23, a TRX section 24, and a memory section 25. Moreover, the mobile station 10 contains a SIM card 26 which is detachable to the mobile station 10. While the SIM card 26 is attached in the mobile station 10, the mobile station 10 can access a mobile communication service network.

The memory section 25 has an SIM data storing section 252 storing a part of various data storing in the SIM card 26 inserted into the mobile station 10 when the mobile station 10 can previously access a mobile communication service network. The memory section 25 has a secret number storing section 251 for storing a secret number registered in the mobile station 10 itself.

After the power supply of the mobile station 10 is turned on and the power is supplied to the mobile station 10, the controller 21 obtains a data from the inserted SIM card 26. Next, the controller 21 judges whether or not the inserted SIM card 26 is the same as the previously inserted SIM card 26 by comparing the part of various data storing the SIM data storing section 252 and the obtained data.

If the inserted SIM card 26 is different from the previously inserted SIM card 26, the controller requests a user to input a secret number from the key input section 22. When a inputted number is inputted from the key input section 22, the controller 21 compares the inputted number with a secret number storing in the secret number storing section 251.

When the inputted number is equal to (or matches) the secret number, the mobile station inserted new SIM card 26 can access a mobile communication service network. When the inputted number is different from the secret number, the mobile station 10 inserted new SIM card 26 does not receive any operation except the above-described operation after turning on the power supply key.

The controller 21 is composed of a logic circuit (not shown) such as a micro computer. The key input section 22, the display 23, the TRX section, the memory section 25, and the SIM card 26 are connected with the controller 21.

The key input section 22 is relates to the key input section 13 shown in FIG. 1A. The key input section 22 has various keys arranged pre-determined array. The key operation in the key input section 22 causes a data to be inputted to the controller 21. The key input section 22 has a power source key 221. Here, the power source key 221 is relates to the power source key 14 shown in FIG. 1A. The power supply pack attached the mobile station 10 starts supplying the power to the mobile station 10 in response to turning on the power source key 221. The power supply pack attached the mobile station 10 stops to supply the power to the mobile station 10 in response to turning off the power source key 221.

The display 23 is relates to the display 12 shown in FIG. 1A, and displays an image data, a telephone number of a call destination.

The TRX section 24 services as a transmitting and receiving section, and indicates the antenna 11 shown in FIG. 1.

The memory section 25 includes ROM (read only memory) and RAM (random access memory). The ROM stores in advance an operational procedure of the mobile station 10, a program to be executed at the controller 21, and a character data displayed in the display 23. The RAM transiently stores various data, such as a short dial data stored in the SIM card 26. The controller 21 controls to read out of a data stored the memory section 25 and write a data to the memory section 25. Also, the memory section 25 may have a non-volatile RAM such as a flash memory or an EEPROM, and the non-volatile RAM may store the secret number storing section 251 and the SIM data storing section 252.

The SIM card 26 stores an IMSI number, a PIN number, a telephone number data of a subscriber, and a short dial data registered by a user. A CPU (central processing unit) is mounted in the SIM card 26. The CPU collates a PIN number stored in the SIM card 26 with a secret number inputted by a user of the mobile station 10.

The configuration of the SIM data storing section 252 will be described below.

Figure 3:
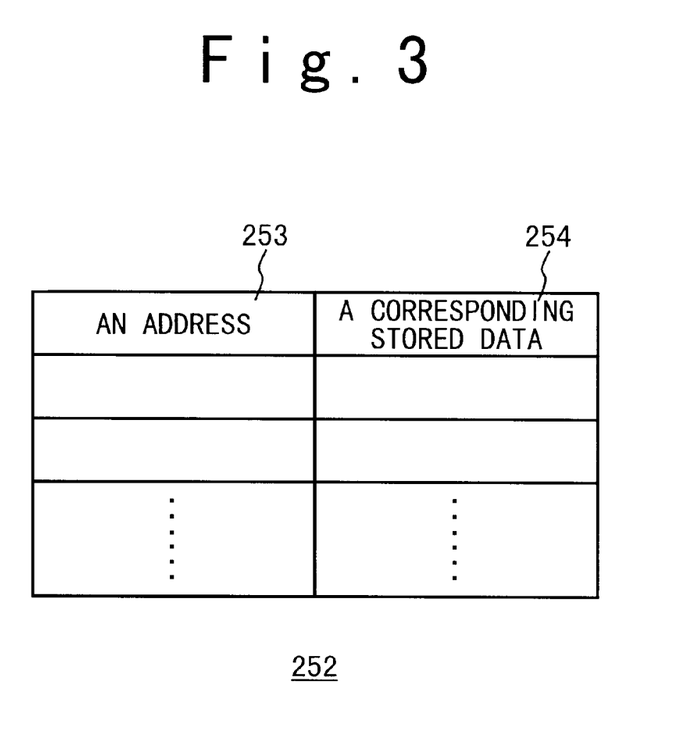
FIG. 3 shows a table including in an SIM data storing section.

FIG. 3 shows a table including in the SIM data storing section 252.

The SIM data storing section 252 is used when the mobile station 10 identifies whether or not the inserted SIM card 26 is equal to the previously inserted SIM card 26. This SIM data storing section 252 stores at least one pair of an address number 253 and a storing data 254 which is stored in a memory area of the SIM card 26 indicated in the address number 253. When the stored data 254 is composed of a code data constituted by at least one bit, a start bit of the code data is stored in a memory area of the SIM card 26 indicated in the address number 253.

The controller reads out a data stored in the address number 253 of the SIM card 26 and stores the data as the stored data 254 in the SIM data storing section 252 when the mobile communication terminal has previously accessed the network. In case that the SIM card 26 is exchanged after the mobile communication terminal has previously accessed the network, the stored data 254 is not equal to (or do not match) a data stored in the address number 253 of the exchanged SIM card 26. In case that the SIM card 26 is not exchanged after the mobile communication terminal has previously accessed the network, the stored data 254 is equal to a data stored in the address number 253 of the non-exchanged SIM card 26. Therefore, when power is started supplying to the mobile station 10, the mobile station 10 checks whether or not the stored data 254 is equal to a data stored in the address number 253 within the SIM card 26 to identify whether or not the SIM card 26 is exchanged.

The address number 253 and the stored data 254 according to a first concrete embodiment will be described below.

Here, data stored in the SIM card 26 are classified first data and second data. The first data are not updated. Each of the SIM cards 26 stores respective first data. The second data are updated by data inputted by the user. The SIM card 26 stores the first data and the second data in pre-determined memory area. The first data includes an accounting data, an INIT number, a PIN number, and a telephone number of the owner of the SIM card 26. The second data includes a personal data inputted by the user, such as a telephone number except the owner, a name, and an address.

In the address number 253 and the stored data 254 according to a first concrete embodiment, the address number 253 is pre-determined and is included in the area stored the first data in the SIM card 26. In this case, when the data within the SIM card 26 are updated, the first data is not updated, and a data indicated in the address number 253 within the SIM card 26 is not exchanged. Therefore, the stored data 254 is not exchanged until the SIM card 26 inserted in the mobile station 10 is exchanged. In the first concrete embodiment, the stored data 254 is not updated just before power is stopped supplying to the mobile station 10. It is desirable to use the first concrete embodiment to simplify the operation with regard to the SIM data storing section.

The address number 253 and the stored data 254 according to a second concrete embodiment will be described below.

In the address number 253 and the stored data 254 according to a second concrete embodiment, the address number 253 is pre-determined and is included in the area stored the second data in the SIM card 26. In this case, when the data within the SIM card 26 are updated, the second data is updated, and a data indicated in the address number 253 within the SIM card 26 exchanged. Therefore, the stored data 254 is exchanged when the SIM card 26 inserted in the mobile station 10 is exchanged. In the second concrete embodiment, the stored data 254 needs to be updated just before power is stopped supplying to the mobile station 10.

The address number 253 and the stored data 254 according to a third concrete embodiment will be described below.

In the address number 253 and the stored data 254 according to a third concrete embodiment, the address number 253 is changeable and is included in the area stored the first data in the SIM card 26. In this case, when the address number 253 is updated, the corresponding stored data is updated referring the data stored in the updated address number 253 within the SIM card 26.

The address number 253 and the stored data 254 according to a fourth concrete embodiment will be described below.

In the address number 253 and the stored data 254 according to a fourth concrete embodiment, the address number 253 is changeable and is included in the area stored the second data in the SIM card 26. In this case, when the data within the SIM card 26 are updated, the second data is updated, and a data indicated in the address number 253 within the SIM card 26 is exchanged. Therefore, the stored data 254 is exchanged when the SIM card 26 inserted in the mobile station 10 is exchanged. Moreover, when the address number 253 is updated, the corresponding stored data is updated referring the data stored in the updated address number 253 within the SIM card 26.

Also, according to the first to fourth concrete embodiments, the stored data 254 may accidentally coincide with the data stored in the address number 253 within the exchanged SIM card 26. The SIM data storing section 252 may have a plurality of a pair of the address number 253 and the stored data 254 to reduce the probability of the above-described accidental coincidence. At this time, from viewpoint of reducing a usable inner capacity of the memory section 25, making a retrieval operation faster and saving an electrical power, the SIM data storing section 252 may desirably have two to five different address numbers 253 and the corresponding stored data 254.

Otherwise, according to the first to fourth concrete embodiments, the stored data 254 in composed of a plurality of bits whose start bit a bit stored in the address number 253 within the SIM card 26 to reduce the probability of the above-described accidental coincidence. Also in this case, the stored data 254 may desirably have about two bits to 16 ($2^4$) bits, from the viewpoints of reducing the usable inner capacity of the memory section 25, making the retrieval operation faster and saving the electrical power.

The various embodiments of the operation of the mobile communication apparatus in the present invention will be described below.

A first embodiment of the operation of the mobile communication terminal according to the present invention is described.

Figure 4A:
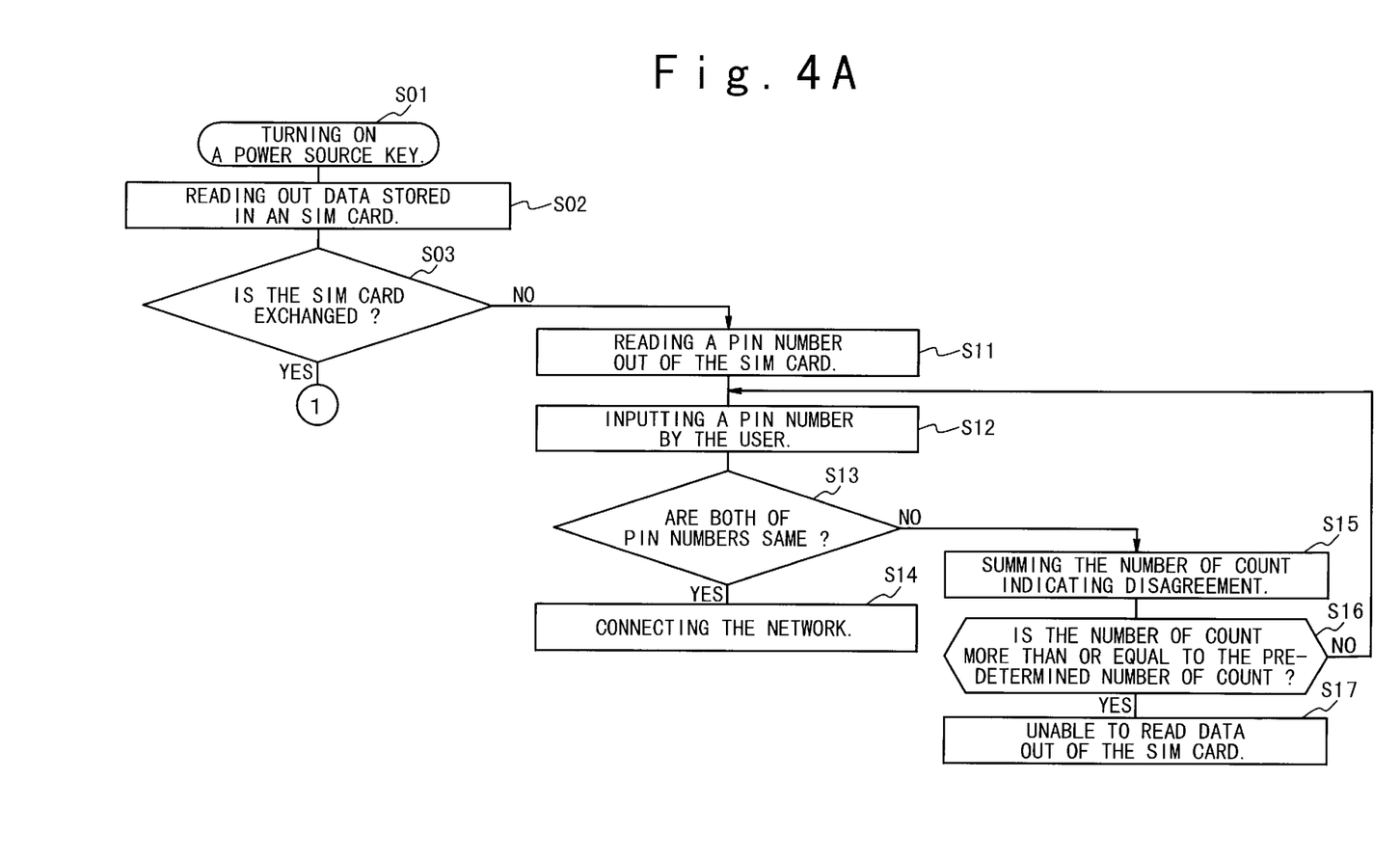
FIGS. 4A and 4B are a flowchart showing a first operative embodiment of the mobile communication terminal according to the present invention.
Figure 4B:
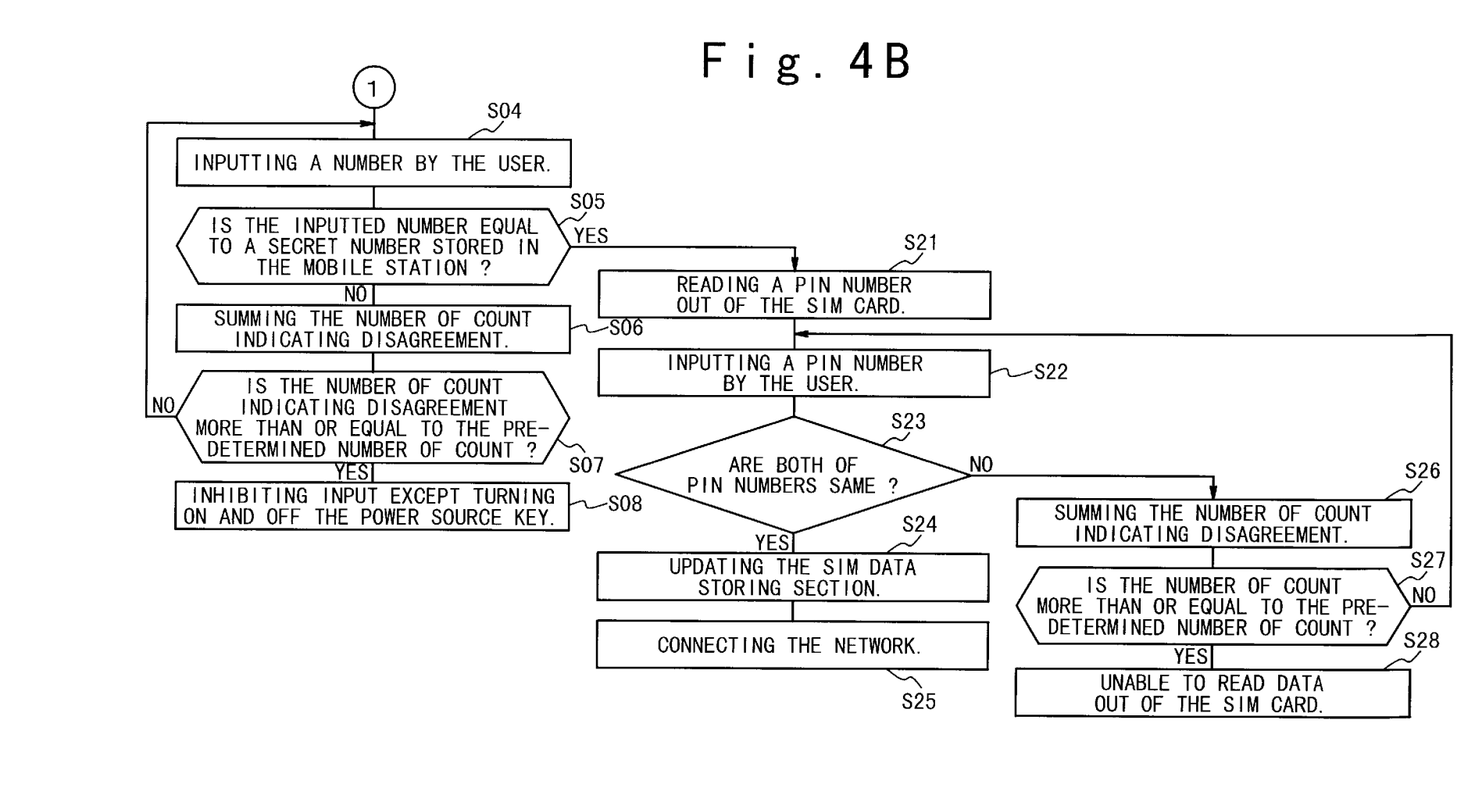

FIGS. 4A and 4B are a flowchart showing a first operative embodiment of the mobile communication terminal according to the present invention. In this first operative embodiment, the mobile station 10 cannot check whether or not the SIM card 26 inserted in the mobile station 10 is exchanged while the power is previously stopped supplying to the mobile station 10 and is again start supplying to the mobile station 10. Moreover, the mobile station 10 stores the address number 253 and the stored data 254 in the SIM data storing section 252. Here, the stored data 254 is obtained from the SIM card 26 inserted before the power is previously stopped supplying to the mobile station 10.

At a step S01, a user of the mobile station 10 attached the power supply pack 16 turns on the power source key 221 of the key input section 22. Accordingly, the power is started supplying to the mobile station 10 from the power supply pack 16 and the controller 21 starts the operation.

At a step S02, the controller 21 reads out the data storing the SIM card 26 attached in the mobile station 10 and transiently stores the minimum data in the memory section 25. The minimum data is used for judging whether or not the SIM card 26 is exchanged.

Here, when the SIM data storing section 252 is consist of the table shown in FIG. 3, the minimum data may be composed of the data stored in the address number 253 of the attached SIM card 26. Here, when the stored data 254 is composed of a pre-determined length of a code data, the minimum data may be composed of the pre-determined length of a code data of which start bit is a bit stored in the address number 253 of the attached SIM card 26.

At a step S03, the controller 21 compares the stored data 254 and the minimum data. When the stored data 254 is equal to the minimum data, the controller 21 recognizes that the attached SIM card 26 is not exchanged and a step S11 is performed. When the stored data 254 is not equal to the minimum data, the controller 21 recognizes that the attached SIM card 26 is exchanged and a step S04 is performed.

At the step S04, the user inputs a number from the key input section 22 in response to the inquiry of inputting the secret number by the mobile station 10. The inputted number is transiently stored in the memory section 25.

At a step S05, the controller 21 compares the inputted number transiently stored in the memory section 25 at the step S04, with an secret number in advance stored in the secret number memory 251 of the memory section 25. When the inputted number is equal to the secret number, a step S21 is performed. When the inputted number is not equal to the secret number, a step S06 is performed.

At a step S06, 1 is added to the number of count indicating disagreements about the secret number.

At a step S07, when the number of count indicating disagreements about the secret number is equal to or greater than a pre-determined number of count, a step S08 is performed. When the number of count indicating disagreements about the secret number is smaller than a pre-determined number of count about the secret number, a step S04 is performed again. Here, the pre-determined number of count about the secret number may be a natural number equal to or greater than 1. Moreover, the number of 3 to 5 is desirable for the pre-determined number of count about the secret number in view of miss-input by the user and reduction of an electric consumption at the mobile station 10.

Here, if the pre-determined number of count about the secret number is set to 1, the operations at the steps S06, S07 are not necessary. In this case, when the inputted number is not equal to the secret number at the step S05, a step S08 is performed.

At the step S08, the controller 21 inhibits input signals except the input signal generated when the power source key 221 of the key input section 22 is turned on or off. The mobile station 10 proceeds to a state of waiting for the input signal generated in response to turning on and off the power supply key 211.

At the step S11, the controller reads a PIN number out of the attached SIM card 26. At this time, the number of count indicating disagreements about the PIN number is initialized (an initial value is set to the number of count indicating disagreements about the PIN number).

At a step S12, the user inputs a number from the key input section 22 in response to the inquiry of inputting the PIN number by the mobile station 10.

At a step S13, the controller 21 compares the PIN number read out of the inserted SIM card 26 with the inputted number by the user. When the PIN number is equal to the inputted number, a step S14 is preformed. When the PIN number is not equal to the inputted number, a step S15 is preformed.

At the step S14, the mobile station 10 can connect the network. Then, the confirmation operation to the user in the mobile station 10 is ended.

At the step S15, 1 is added to the number of count indicating disagreements about the PIN number.

At a step S16, the controller compares the number of count indicating disagreements about the PIN number with a pre-determined number of count about the PIN number. When the number of count indicating disagreements about the PIN number is equal to or greater than the pre-determined number of count about the PIN number, a step S17 is preformed. When the number of count indicating disagreements about the PIN number is smaller than the pre-determined number of count about the PIN number, a step S12 is preformed again. Here, the pre-determined number of count about the PIN number may be the natural number equal to or greater than 1. Moreover, the number of 3 to 5 are desirable for the pre-determined number of count about the PIN number in view of miss-input by the user and reduction of an electric consumption at the mobile station 10.

Here, if the pre-determined number of count about the PIN number is set to 1, the operations at the steps S15, S16 are not necessary. In this case, when the inputted number is not equal to the PIN number at the step S13, the step S17 is performed.

At the step S17, the controller 21 cannot read data out of the SIM card 26, and thereby the mobile station 10 cannot access the network. And then, the controller 21 inhibits input signals except the input signal generated when the power source key 221 of the key input section 22 is turned on or off. The mobile station 10 proceeds to a state of waiting for the input signal generated in response to turning on and off the power supply key 211.

At a step S21, the controller reads a PIN number out of the attached SIM card 26. At this time, the number of count indicating disagreements about the PIN number is initialized (an initial value is set to the number of count indicating disagreements about the PIN number).

At a step S22, the user inputs a number from the key input section 22 in response to the inquiry of inputting the PIN number by the mobile station 10.

At a step S23, the controller 21 compares the PIN number read out of the inserted SIM card 26 with the inputted number by the user. When the PIN number is equal to the inputted number, a step S24 is preformed. When the PIN number is not equal to the inputted number, a step S26 is preformed.

At the step S24, the SIM data storing section 252 of the memory section 25 in the mobile station 10 is updated into the data of the exchanged SIM card 26.

At the step S25, the mobile station 10 updated the SIM data storing section 252 at the step S24 can connect the network. Then, the confirmation operation to the user in the mobile station 10 is ended.

At the step S26, 1 is added to the number of count indicating disagreements about the PIN number.

At a step S27, the controller compares the number of count indicating disagreements about the PIN number with a pre-determined number of count about the PIN number. When the number of count indicating disagreements about the PIN number is equal to or greater than the pre-determined number of count about the PIN number, a step S28 is preformed. When the number of count indicating disagreements about the PIN number is smaller than the pre-determined number of count about the PIN number, a step S22 is preformed again. Here, the pre-determined number of count about the PIN number may be the natural number equal to or greater than 1. Moreover, the number of 3 to 5 are desirable for the pre-determined number of count about the PIN number in view of miss-input by the user and reduction of an electric consumption at the mobile station 10.

Here, if the pre-determined number of count about the PIN number is set to 1, the operations at the steps S26, S27 are not necessary. In this case, when the inputted number is not equal to the PIN number at the step S23, a step S28 is performed.

At the step S28, the controller 21 cannot read data out of the SIM card 26, and thereby the mobile station 10 cannot access the network. And then, the controller 21 inhibits input signals except the input signal generated when the power source key 221 of the key input section 22 is turned on or off. The mobile station 10 proceeds to a state of waiting for the input signal generated in response to turning on and off the power supply key 211.

As mentioned above, in the first operative embodiment of the mobile station 10 according to the present invention, the mobile station 10 checks whether or not the SIM card 26 is exchanged when the power supply to the mobile station 10 is turned on. When the SIM card 26 is exchanged, the mobile station 10 confirms whether or not the body of the mobile station 10 as well as the SIM card 26 belongs to an owner or a co-owner. Accordingly, when a third person picks up the mobile station and he or she removes the pre-attached SIM card from the mobile station 10 and attaches the one's own SIM card in the mobile station 10, the SIM exchanged mobile station 10 can be limited to access the network.

A second operative embodiment of the mobile communication terminal according to the present invention is described.

In the second operative embodiment, the mobile station 10 can confirm whether or not an SIM card 26 is detached after a previous use. As example, the mobile station 10 has a flag stored in a pre-determined area of a memory section 27. The flag is updated from 0 to 1 in response to an operation of opening and closing the SIM installation section 17 shown in FIG. 1. An energizing circuit (not shown) is mounted in the SIM installation section 17. This energizing circuit is energized when the SIM installation section 17 is closed. This energizing circuit is not energized when the SIM installation section 17 is opened. For example, when the SIM installation section 17 has a claw for fixing the attached SIM card 18, the claw is designed to be a switch of the energizing circuit. In this case, when the SIM installation section 17 is opened, the claw is apart from the mobile station 10, and then the energizing circuit is cut off. When the energized state of the energizing circuit is cut off, the flag is updated from 0 to 1. Also, the flag is returned back to 0 while the mobile station 10 is in an ON-state of the power supply (a reset of the flag). Especially, the reset of the flag is performed just before the power is stopped supplying the mobile station 10 or when the mobile station 10 becomes to access the network.

Also, referring to FIG. 1, the exchange of the SIM card 18 is physically impossible unless the power supply pack 16 is removed from the mobile station 10, in the mobile station 10 according to the present invention. In this case, the body of the mobile station 10 further contains an electrical power accumulator (not shown) for accumulating an electric power at which the operations of energizing and updating the flag are possible even if the power supply 15 is removed. The above-mentioned operation of updating the flag is carried out by the controller 21 which is operated by using the electrical power accumulated in this electrical power accumulator.

Figure 5:
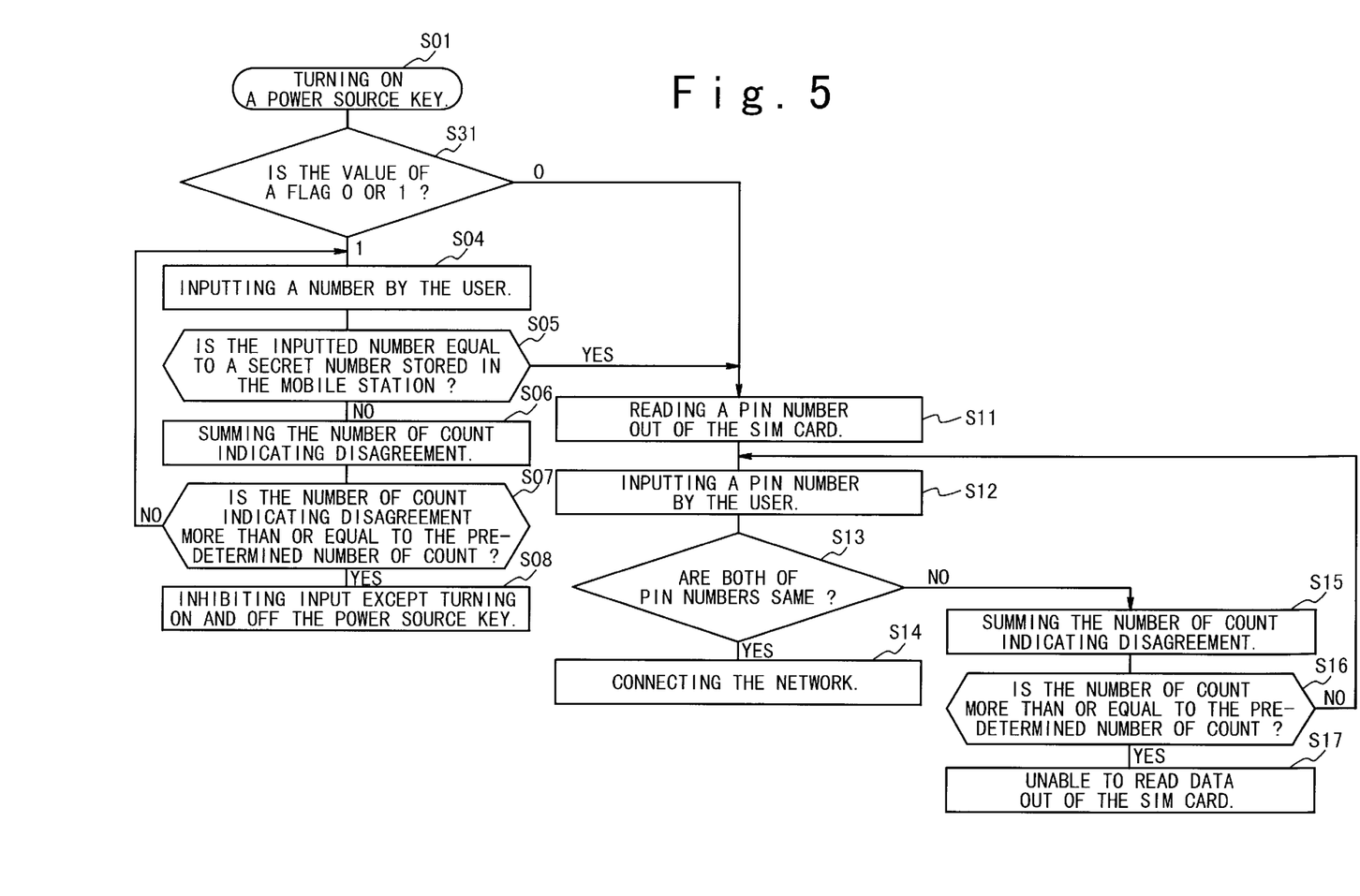
FIG. 5 is a flowchart showing a second operative embodiment of the mobile communication terminal according to the present invention.

FIG. 5 is a flowchart showing a second operative embodiment of the mobile communication terminal according to the present invention.

At a step S01, a user of the mobile station 10 attached the power supply pack 16 turns on the power source key 221 of the key input section 22. Accordingly, the power is started supplying to the mobile station 10 from the power supply pack 16 and the controller 21 starts the operation.

At a step S31, the controller 21 obtains the value of the flag within the memory section 25. When the value of the flag is 0, the controller 21 judges that the SIM card 26 is not exchanged and the step Sll is performed. When the value of the flag is 1, the controller 21 judges that the SIM card 26 is exchanged and the step S04 is preformed.

At the step S04, the user inputs a number from the key input section 22 in response to the inquiry of inputting the secret number by the mobile station 10. The inputted number is transiently stored in the memory section 25.

At a step S05, the controller 21 compares the inputted number transiently stored in the memory section 25 at the step S04, with an secret number in advance stored in the secret number memory 251 of the memory section 25. When the inputted number is equal to the secret number, a step S21 is performed. When the inputted number is not equal to the secret number, a step S06 is performed.

At a step S06, 1 is added to the number of count indicating disagreements about the secret number.

At a step S07, when the number of count indicating disagreements about the secret number is equal to or greater than a pre-determined number of count, a step S08 is performed. When the number of count indicating disagreements about the secret number is smaller than a pre-determined number of count about the secret number, a step S04 is performed again. Here, the pre-determined number of count about the secret number may be a natural number equal to or greater than 1. Moreover, the number of 3 to 5 is desirable for the pre-determined number of count about the secret number in view of miss-input by the user and reduction of an electric consumption at the mobile station 10.

Here, if the pre-determined number of count about the secret number is set to 1, the operations at the steps S06, S07 are not necessary. In this case, when the inputted number is not equal to the secret number at the step S05, the step S08 is performed.

At the step S08, the controller 21 inhibits input signals except the input signal generated when the power source key 221 of the key input section 22 is turned on or off. The mobile station 10 proceeds to a state of waiting for the input signal generated in response to turning on and off the power supply key 211.

At the step S11, the controller reads a PIN number out of the attached SIM card 26. At this time, the number of count indicating disagreements about the PIN number is initialized (an initial value is set to the number of count indicating disagreements about the PIN number).

At a step S12, the user inputs a number from the key input section 22 in response to the inquiry of inputting the PIN number by the mobile station 10.

At a step S13, the controller 21 compares the PIN number read out of the inserted SIM card 26 with the inputted number by the user. When the PIN number is equal to the inputted number, a step S14 is preformed. When the PIN number is not equal to the inputted number, a step S15 is preformed.

At the step S14, the mobile station 10 can connect the network. Then, the confirmation operation to the user in the mobile station 10 is ended.

At a step S16, the controller compares the number of count indicating disagreements about the PIN number with a pre-determined number of count about the PIN number. When the number of count indicating disagreements about the PIN number is equal to or greater than the pre-determined number of count about the PIN number, a step S17 is preformed. When the number of count indicating disagreements about the PIN number is smaller than the pre-determined number of count about the PIN number, a step S12 is preformed again. Here, the pre-determined number of count about the PIN number may be the natural number equal to or greater than 1. Moreover, the number of 3 to 5 are desirable for the pre-determined number of count about the PIN number in view of miss-input by the user and reduction of an electric consumption at the mobile station 10.

Here, if the pre-determined number of count about the PIN number is set to 1, the operations at the steps S15, S16 are not necessary. In this case, when the inputted number is not equal to the PIN number at the step S13, a step S17 is performed.

At the step S17, the controller 21 cannot read data out of the SIM card 26, and thereby the mobile station 10 cannot access the network. And then, the controller 21 inhibits input signals except the input signal generated when the power source key 221 of the key input section 22 is turned on or off. The mobile station 10 proceeds to a state of waiting for the input signal generated in response to turning on and off the power supply key 211.

As mentioned above, similarly to the first operative embodiment of the mobile station 10 according to the present invention, in the second operative embodiment of the mobile station 10 according to the present invention, the mobile station 10 checks whether or not the SIM card 26 is exchanged when the power supply to the mobile station 10 is turned on. When the SIM card 26 is exchanged, the mobile station 10 confirms whether or not the body of the mobile station 10 as well as the SIM card 26 belongs to an owner or a co-owner. Accordingly, when a third person picks up the mobile station and he or she removes the pre-attached SIM card from the mobile station 10 and attaches the one's own SIM card in the mobile station 10, the SIM exchanged mobile station 10 can be limited to access the network.

In the second operative embodiment of the mobile station 10 according to the present invention, the mobile station 10 checks the value of the flag to judge whether or not the SIM card 26 is exchanged. This flag is obtained correspondingly to the action of opening the SIM installation section 17. Thus, in the second operative embodiment, the operations with regard to checking whether or not the SIM card 26 is exchanged (at the steps S02, S03 and S24 in the first operative embodiment) is preformed by checking the value of the flag. Therefore, the second operative embodiment can be more simplified than the first operative embodiment.

Also, the second operative embodiment of the mobile station 10 in the present invention does not require the SIM data storing section 252 shown in the function block diagram of FIG. 2. In the second operative embodiment, the value of the flag is used for judging whether or not the SIM card 26 is exchanged, and the SIM data storing section 252 is not used as the device for judging whether or not the SIM card 26 is exchanged.

As mentioned above, the mobile communication terminal according to the present invention can confirm the owner of the body of the mobile communication terminal. When the user is lost or stolen the mobile communication terminal according to the present invention and the third person obtains the lost or stolen mobile communication terminal, the body of the mobile communication terminal protects the third person from exchanging the SIM card in the lost or stolen mobile communication and illegally using.

What is claimed is:

1. A mobile communication terminal comprising:
   a body; and
   an IC (Integrated Circuit) card mounted on said body;
   wherein said body includes,
      an input portion used to inputting a first code or a second code,
      a detecting portion detecting whether or not said mounted IC card is same as an IC card mounted when said mobile communication terminal has previously accessed a network as a previous IC card, and a first controller allowing said body to be operated in response to said first code from said input portion when said detecting portion detects that said mounted IC card differs from said previous IC card, a second controller allowing said body to be operated when said detecting portion detects that said mounted IC card is same as said previous IC card, and a third controller allowing said mobile communication terminal to access the network in response to said second code from said input portion after said first controller allows said body to be operated.

2. A mobile communication terminal according to claim 1, wherein said body stores a body identifying code, and said first controller allows said body to be operated when said first code matches said body identifying code.

3. A mobile communication terminal according to claim 1, wherein said mounted IC card stores a card identifying code, and said third controller allows said mobile communication terminal to access a network when said second code matches said card identifying code.

4. A mobile communication terminal according to claim 1, wherein said detecting portion detects that said previous IC card is replaced by said mounted IC card after said mobile communication terminal has previously accessed the network.

5. A mobile communication terminal according to claim 1, further comprising:

a power supply portion mounted on said body and supplying power to said body; and wherein said detecting portion detects that said previous IC card is replaced by said mounted IC card by detecting whether or not said power supply portion is detached from said body after said mobile communication terminal has previously accessed the network.

6. A mobile communication terminal according to claim 1, wherein said body further includes;

a memory storing a first data stored in a pre-determined memory area of said previous IC card, and wherein said third controller reads a second data stored in said pre-determined memory area of said IC card and allows said body to be operated when said first data matches said second data.

7. A mobile communication terminal according to claim 6, wherein said memory further has at least one address; and said pre-determined memory area is indicated in said at least one address.

8. A mobile communication terminal according to claim 6, wherein said memory includes a non-volatile memory.

9. A mobile communication terminal according to claim 1, wherein said mounted IC card and said previous IC card include SIM (Subscriber Identity Module) cards.

10. A method of allowing a mobile communication terminal to access a network, wherein said mobile communication terminal includes a body, a power supply portion supplying power to said body, and an IC card mounted on said body, comprising:

(a) detecting whether or not said mounted IC card is same as an IC card mounted when said mobile communication terminal has previously accessed a network as a previous IC card;

(b) allowing said body to be operated when said detecting portion detects that said mounted IC card is same as said previous IC card;

(c) inputting a first code when said detecting portion detects that said mounted IC card differs from said previous IC card;

(d) allowing said body to be operated in response to said first code;

(e) inputting a second code after said first controller allows said body to be operated;

(f) allowing said mobile communication terminal to access the network in response to said second code.

11. A method of allowing a mobile communication terminal to access the network according to claim 10, further comprising:

(g) storing a body identifying code in said body; and wherein said (d) controlling allows said body to be operated when said first code matches said body identifying code.

12. A method of allowing a mobile communication terminal to access the network according to claim 10, further comprising:

(h) storing a card identifying code in said IC card; and wherein said (f) controlling allows said mobile communication terminal to access the network when said second code matches said card identifying code.

13. A method of allowing a mobile communication terminal to access the network according to claim 10, wherein said (a) detecting detects whether or not said previous IC card is replaced by said mounted IC card after said mobile communication terminal has previously accessed the network.

14. A method of allowing a mobile communication terminal to access the network according to claim 10, wherein said (a) detecting detects whether or not said previous IC card is replaced by said mounted IC card by detecting whether or not said power supply portion is detached from said body after said mobile communication terminal has previously accessed the network.

15. A method of allowing a mobile communication terminal to access the network according to claim 10, further comprising:

(i) storing a first data stored in a pre-determined memory area of said previous IC card when said mobile communication terminal has previously accessed the network; and wherein said (a) detecting includes;

(j) reading a second data stored in said pre-determined memory area of said mounted IC card, and (k) comparing said first data to said second data; and said (b) allowing allows said body to be operated when said first data matches said second data, and said (c) inputting inputs a first code when said first data differs from said second data.

16. A method of allowing a mobile communication terminal to access the network according to claim 15, further comprises:

(l) storing at least one address, and wherein said pre-determined memory area is indicated in said at least one address.

17. A method of allowing a mobile communication terminal to access the network according to claim 10, wherein said mounted IC card and said previous IC card include SIM (Subscriber Identity Module) cards.

* * * * *